United States Patent
Vel (10) Patent No.: US 10,665,121 B2
(45) Date of Patent: May 26, 2020

(54) EDUCATIONAL GAMING SYSTEM (71) Applicant: Sakthi A Vel, Hockessin, DE (US)

(72) Inventor: Sakthi A Vel, Hockessin, DE (US)

(*) Notice: Subject to any disclaimer, the term of this patent is extended or adjusted under 35 U.S.C. 154(b) by 558 days.

(21) Appl. No.: 15/188,499

(22) Filed: Jun. 21, 2016

(65) Prior Publication Data

US 2017/0365180 A1 Dec. 21, 2017

(51) Int. Cl.
- A63F 9/24 (2006.01)
- G09B 7/02 (2006.01)
- G09B 7/077 (2006.01)
- G09B 19/02 (2006.01)

(52) U.S. Cl.
CPC ............. *G09B 7/02* (2013.01); *G09B 7/077* (2013.01); *G09B 19/02* (2013.01); *G09B 19/025* (2013.01)

(58) Field of Classification Search
None
See application file for complete search history.

(56) References Cited

U.S. PATENT DOCUMENTS

| | | | | |
|---|---|---|---|---|
| 4,593,904 A * | 6/1986 | Graves | A63F 13/12 | 463/9 |
| 6,267,379 B1 * | 7/2001 | Forrest | A63F 9/183 | 273/431 |
| 7,280,975 B1 * | 10/2007 | Donner | G06Q 10/02 | 235/382 |
| 7,896,744 B2 * | 3/2011 | Moreno | A63F 13/12 | 463/42 |
| 8,684,807 B1 * | 4/2014 | Crici | A63F 13/92 | 434/322 |
| 8,858,313 B1 * | 10/2014 | Selfors | A63F 13/335 | 463/42 |
| 2001/0036865 A1 * | 11/2001 | Neal, III | G06Q 30/02 | 463/42 |
| 2002/0042293 A1 * | 4/2002 | Ubale | A63F 13/12 | 463/9 |
| 2005/0043094 A1 * | 2/2005 | Nguyen | G07F 17/32 | 463/42 |
| 2013/0079077 A1 * | 3/2013 | Stegall | A63F 13/80 | 463/9 |
| 2013/0116044 A1 * | 5/2013 | Schwartz | A63F 13/12 | 463/29 |
| 2014/0227675 A1 * | 8/2014 | Budhu | G09B 7/02 | 434/362 |
| 2015/0190709 A1 * | 7/2015 | Moorthy | A63F 9/183 | 463/9 |

* cited by examiner

Primary Examiner — Sunit Pandya (57) ABSTRACT

A system and method for an online educational game to improve skills without spending money are disclosed. It further provides a system and method for the players to increase their winnings by providing gift certificates from companies who want to attract these winners. This game provides players an opportunity to win a prize without having to spend money to buy a ticket and an opportunity to improve vital skills. This invention provides a way of experiencing the thrill of gaming without betting any money. The games could be drawn instantly or periodically. The winnings could be a preset amount or a progressive jackpot.

18 Claims, 7 Drawing Sheets

EDUCATIONAL GAMING SYSTEM

FIELD OF THE INVENTION

The present invention relates to an educational gaming system to encourage learning and practice multiple ways of solving numerical problems so that participants would improve their number sense and win prizes without financial risk.

BACKGROUND OF THE INVENTION

Field of the Disclosure

A system and method are disclosed which generally relate to gaming, and more specifically to educational gaming.

In a typical lottery, a player is required to buy a ticket with money upfront and win a prize. The prize can be won instantly in traditional games, such as peel-off or scratch-off style games. In some types of games, prizes can be won periodically as in daily draw, weekly, monthly or any other periodic draw. The prize amount may remain constant for the period. If there are no winners in a particular period, the prize may roll-over to a progressive jackpot that increases with time until someone wins. The drawbacks/downsides for the player in these conventional lottery systems are many. The player stands to lose the money spent in buying the ticket, may have to wait for the draw and more often than not, ends up with nothing to show for the money spent. Some view lotteries as a regressive tax on the poor since a disproportionately high percentage of the poor play the lotteries.

Motivating students to study and practice to improve fluency in their subjects to acceptable levels, especially in subjects such as mathematics, has been an ongoing problem for parents and the society as a whole. If a student fails to acquire a minimum level of fluency, say with numbers and operations, the student starts lagging behind to a point that he/she is not able to even catch-up, let alone excel. This results in the student being shut out of not only STEM (Science, Technology, Engineering and Mathematics) careers but also unable to make good decisions in day to day financial life, understand odds and be a good citizen in the modern world.

Another problem that the system is aiming to solve is to help Companies are looking for opportunities to get the attention of consumers who are being tugged-at in various directions by the vast choices available on the web, TV, Radio and Print media.

The system and method disclosed herein combine a mathematical game, online advertising for revenue, a gaming system for providing thrills and motivation to return, and an avenue for placing attractive offers for consumers to further increase their winnings. In short, this system is a combination of a search engine (Google, Bing, Yahoo), lottery system (PowerBall, MegaMillions) without the financial risk and deal sites (Groupon, LivingSocial) to motivate students and adults to improve their skills, say fluency with numbers, and to provide them with the thrill of gaming in order to keep them coming back for more.

During the past few years online discounters have made it possible for consumers to buy products and services at a discounted price in order to entice the consumers to sample their products and services with the hope that the consumers will continue to return to their businesses. In this system the players winnings can be enhanced by providing products and services at a discounted price so that the participants can buy them instead of taking cash from the winnings.

Teachers and parents have tried several tactics to get students to practice in order to improve skills, especially in math. They have provided short term benefits of an immediate reward or pointing out potential long term benefits such as improved quality of life in the future.

The gaming systems provide a moment of thrill at the expense of money and it is well known that the "house always wins". Some players flock to these games despite knowing that the odds are stacked against them. A system and method disclosed here provide the following benefits.

1) Certainly improve the players' skills, fluency and sense of winning a game with definite odds so that they are less likely to play lotteries, 2) No loss of money for the players, 3) Provide companies an opportunity to put their products and services in front of consumers who are having a wholesome experience and 4) Provide the thrill of gaming while improving skills and with no financial risk.

SUMMARY OF THE INVENTION

In accordance with the present invention, there is provided a system and method for an online educational game to improve skills without spending money are disclosed. It further provides a system and method for the players to increase their winnings by providing gift certificates with values over and above their winnings from companies who want to attract these winners. This game provides players an opportunity to win a prize without having to spend money to buy a ticket while learning vital skills. This invention provides a way of experiencing the thrill of gaming and winning without betting any money. The lucky winners could be drawn instantly or periodically. The winnings could be a preset amount or a progressive jackpot.

It would be advantageous to provide a learning opportunity while playing the game so that the players improve their skills in basic arithmetic concepts such as addition, subtraction, multiplication and division.

It would also be advantageous to provide a learning opportunity while playing the game so that players can improve their skills in decimals, fractions and algebra.

It would further be advantageous to provide a hands-on lesson in the probability or odds of winning by offering instant win with short odds of winning (say 1 in 10), daily wins with longer odds (say 1 in 1,000) and mega wins with much longer odds (say 1 in 1,000,000) and to set the prizes accordingly.

It would be advantageous to extend this system to other subjects and skills that can be improved and tested online so that the thrill of gaming without financial risk can be used to motivate students and others to practice and improve these skills.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
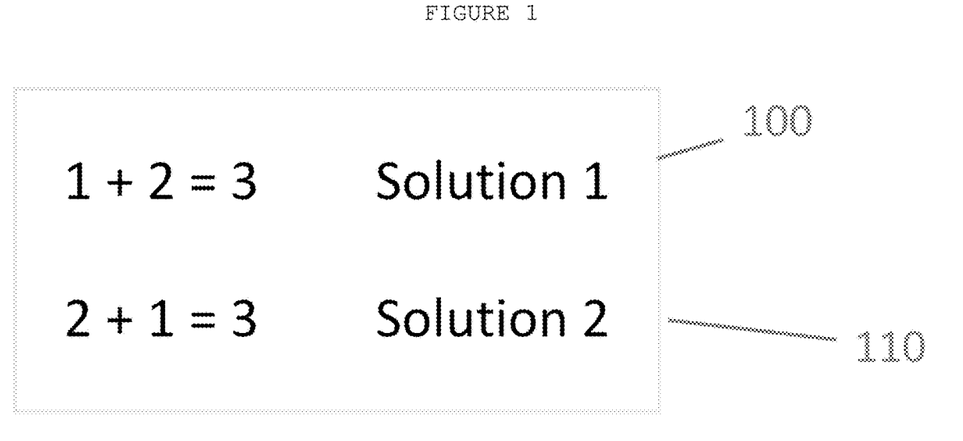
FIG. 1 is a shows two ways of solving a simple problem.

FIG. 1 shows the two ways of solving a simple problem. The problem statement is, "How many ways can you get the desired result 3, with 1 and 2, by using addition, subtraction, multiplication and/or division". A player may present only one solution. Both these solutions given in FIG. 1 are arithmetically correct and the player may provide either Solution 1 100 or Solution 2 110 as his solution. The random number generator can then be used to pick one of these as the winning solution. If the player has selected Solution 1 100 and the random number generator also picked Solution 1 100 as the winning solution, then the player is declared the winner and a prize amount is credited to the player's account. The total number of correct solutions for a problem including all permutations and combinations of numbers and operators then determine the odds of a player winning with his solution. The odds of winning in this particular problem are even (50%), similar to flipping a coin. In this problem, both the operands (1 and 2) and the desired result are randomly generated.

Figure 2:
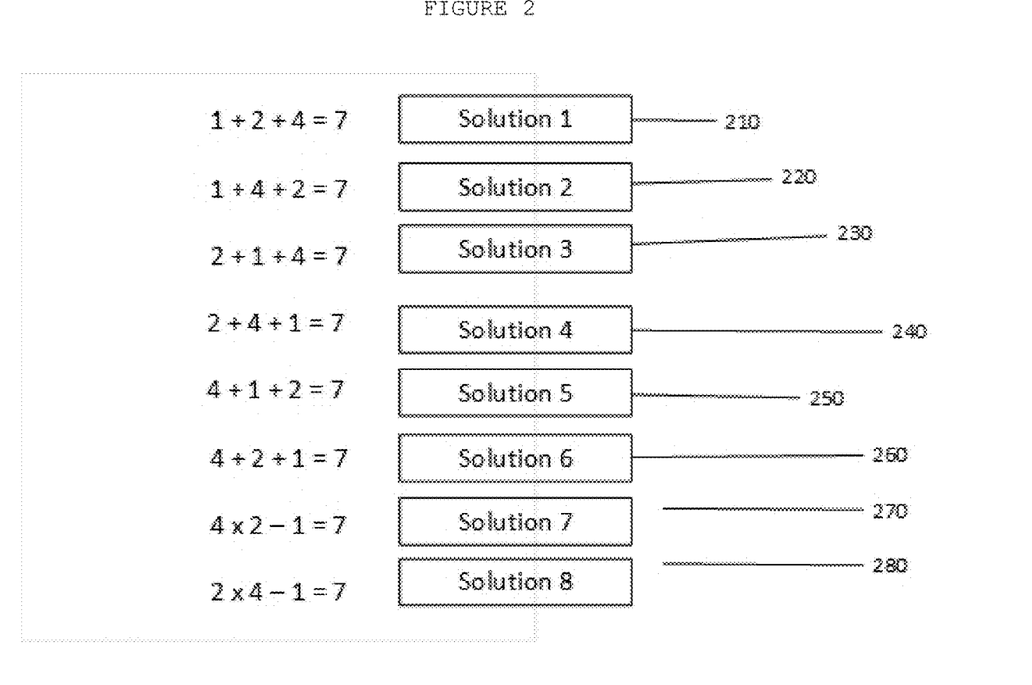
FIG. 2 is an illustration of a problem with eight solutions.

As an additional example, in FIG. 2, there are 8 ways of solving the problem correctly. A player has one in eight chance of winning the instant prize when providing a solution to the problem in FIG. 2.

While these examples use only integers and addition, subtraction, multiplication and division operators, the invention is not limited to these. For example, we can expand these to include decimals and fractions. For operators, we can include square, square roots and so on. We envision that any problem, puzzle or question that produces multiple pathways to a correct solution or has multiple answers can be used. Some obvious popular games include crossword puzzles, Sudoku, among others. Even when there is only one unique solution, a winning solution may be picked with a random event such as the time of solving a problem or the time taken to solve the problem. One may time stamp the event to a milli-second and use the last 3 significant digits as a player's entry to the solution. For example, if a player solves a problem at 10:32:05.245 AM, we can use 245 as his entry ticket number. We can then draw from number 000 to 999 to create a 1 in 1,000 chance of winning. The odds can, of course, be changed easily by picking any other parameter, including picking a time in micro-seconds or some other parameter. This invention is not limited to only mathematical problems and puzzles. It anticipates the use of this platform in various subjects, skills and games. Similarly, the time taken to solve the problem can be used to create a draw from the fractional seconds as shown above. For example, if a player took 2 minutes, 45.245 seconds to solve a problem or answer a question, we can use 245 as his entry ticket number. We can then draw from the number 000 to 999 to create a 1 in 1,000 chance of winning. The odds can be easily changed by picking any other parameter, including picking a time in micro-seconds or some other parameter.

While we have shown embodiments as mathematical puzzles, the method and system described herein are applicable to questions and problems. Listed below are a few examples of various questions and problems.

1) What is the current capital of the USA? The single correct answer is Washington, D.C. We can apply the method of generating the entry by using the time taken to provide the answer or the time at which the answer was given.

2) What is the capital of the USA? a. New York, b. Washington, D.C., c. Paris, d. Moscow. We can apply the method of generating the entry by using the time taken to provide the answer or the time at which the answer was given.

3) If a train travels at 100 miles per hour from New York to Philadelphia, which are 100 miles apart, how long does it take for the train to reach Philadelphia without any stops in between? We can apply the method of generating the entry by using the time taken to provide the answer or the time at which the answer was given.

Figure 3:
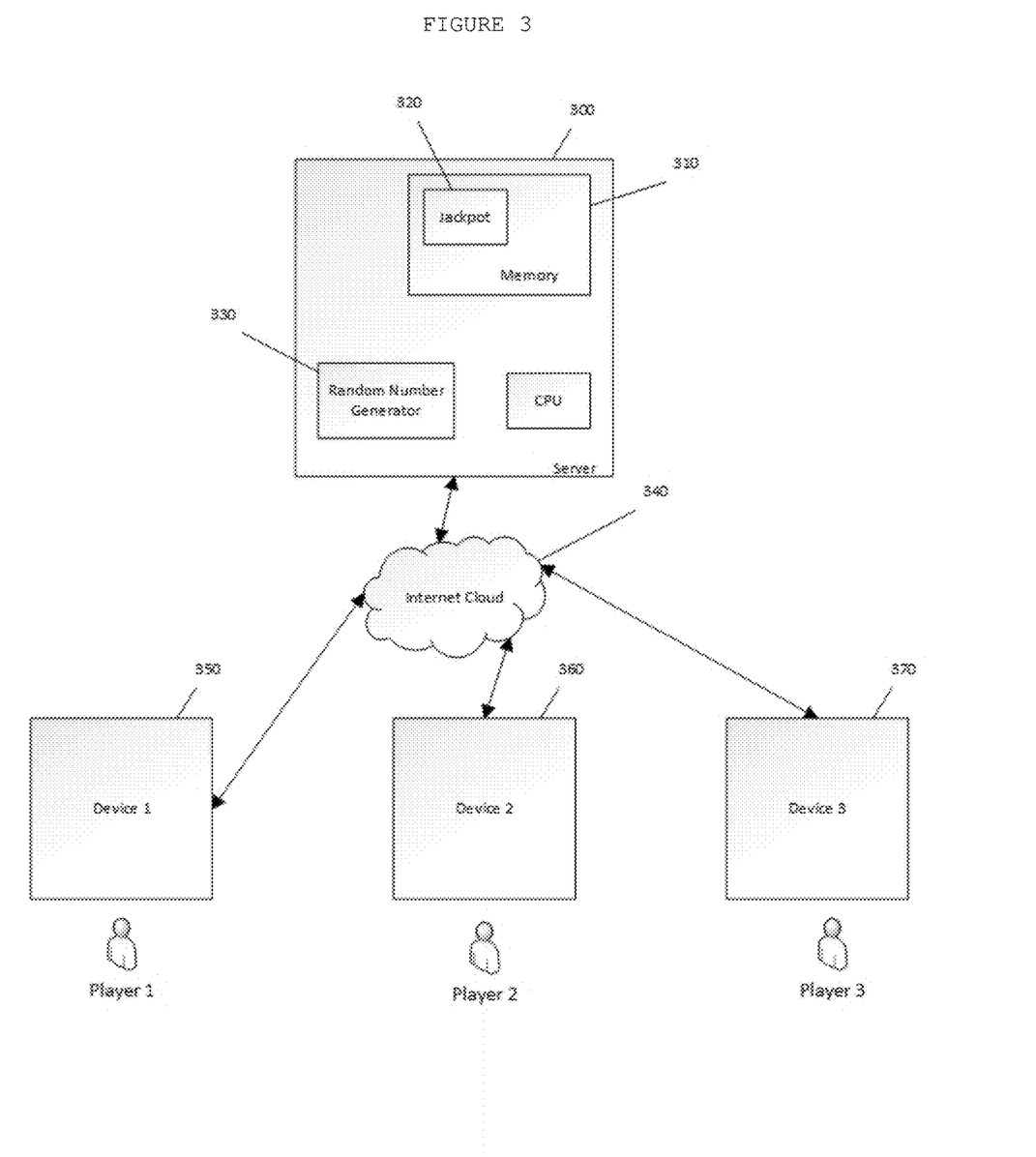
FIG. 3 is an illustration of the online educational gaming system.

FIG. 3 illustrates an educational gaming system with a server 300 connected to three devices, device 1, device 2 and device 3, each of which is used by a player to play the game. The illustration shows the player connected through the internet cloud but it is easily understood that they can be connected through Local Area Networks (LANs), Wide Area Network (WAN), cable, satellite, etc., Alternatively, the server 300 can be hardwired to the devices.

Few embodiments to illustrate this educational gaming system and method are presented. This list is not exhaustive and many additional ways of using this invention can be envisioned and reduced to practice.

Figure 4:
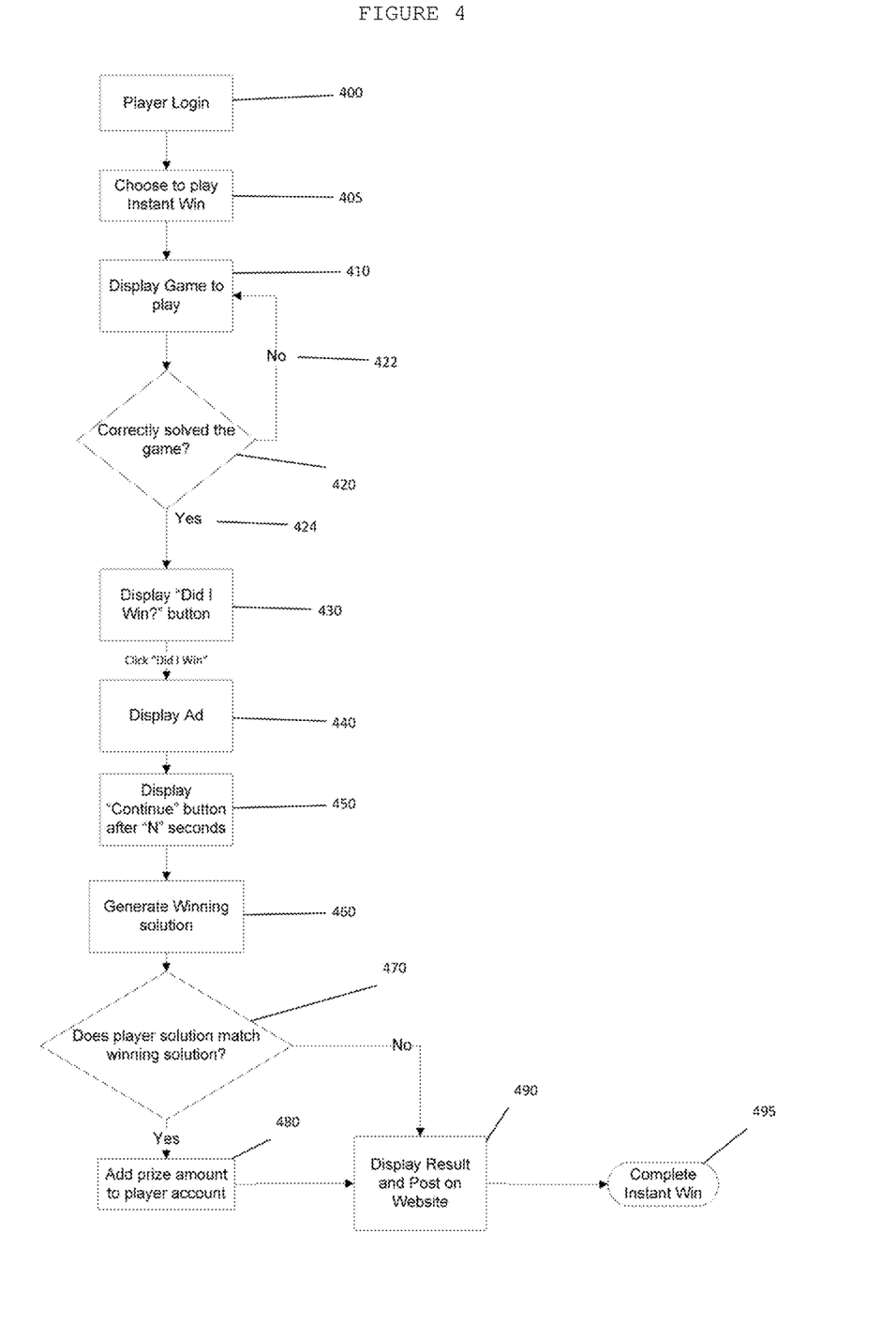
FIG. 4 is a flow chart for an embodiment of an "instant win" game.

FIG. 4 shows an Embodiment for an Instant Win. The order of play for this embodiment is given below. In this example, a player must solve one problem correctly to win instantly. In other embodiments, the number of problems to be solved to win can be increased. Also changeable in other embodiments is the odds of winning a game by presenting a problem with different number of solutions.

1) Player logs in to the system 400
2) Player chooses to play Instant Win 405
3) A problem such as shown in FIG. 1 with two possible solutions is presented to the player for solving 410
4) Player solves the problem correctly with Solution 1 100. If the player did not solve the problem correctly 422, display the same game and give the player an opportunity to solve the problem correctly.
5) Player solves the problem correctly 424 and is presented a button "Did I Win" 430 to find out whether he is a lucky winner.
6) Player presses the "Did I Win" button 430
7) System displays an advertisement 440 for "n" seconds and then display the "Continue" button 450. Once the Continue button is pressed, run the random number generator to generate a winning solution 460. In addition to the advertisement display in 440, it should be kept in mind that advertisements can be displayed in each of the pages for revenue generation.
8) System generates a revenue of x cents to display the ad(s)
9) Display the player's solution and the winning solution side by side.
9.a. If the player's Solution 1 100 is chosen as the winning solution, declare the player as winner 490 and add a prize amount to the player's winnings 480. Also, post the winner's name on the website's winners list.

9.b. If the player's Solution 1 is not chosen as the winning solution, display the result 490 and do not add any money to the player's winnings.

10) This completes the flow for the Instant Win module 495

The odds of winnings in this particular instance is 50%. For every 100 plays, about 50 players will win. The system will generate revenue of 100× cents and can pay out 2× cents to remain cash flow neutral. The system will payout a fraction of 2× cents for each winner, say x cents and the remaining funds (x cents) are used to provide for the cost of running the system and to generate a profit.

Figure 5:
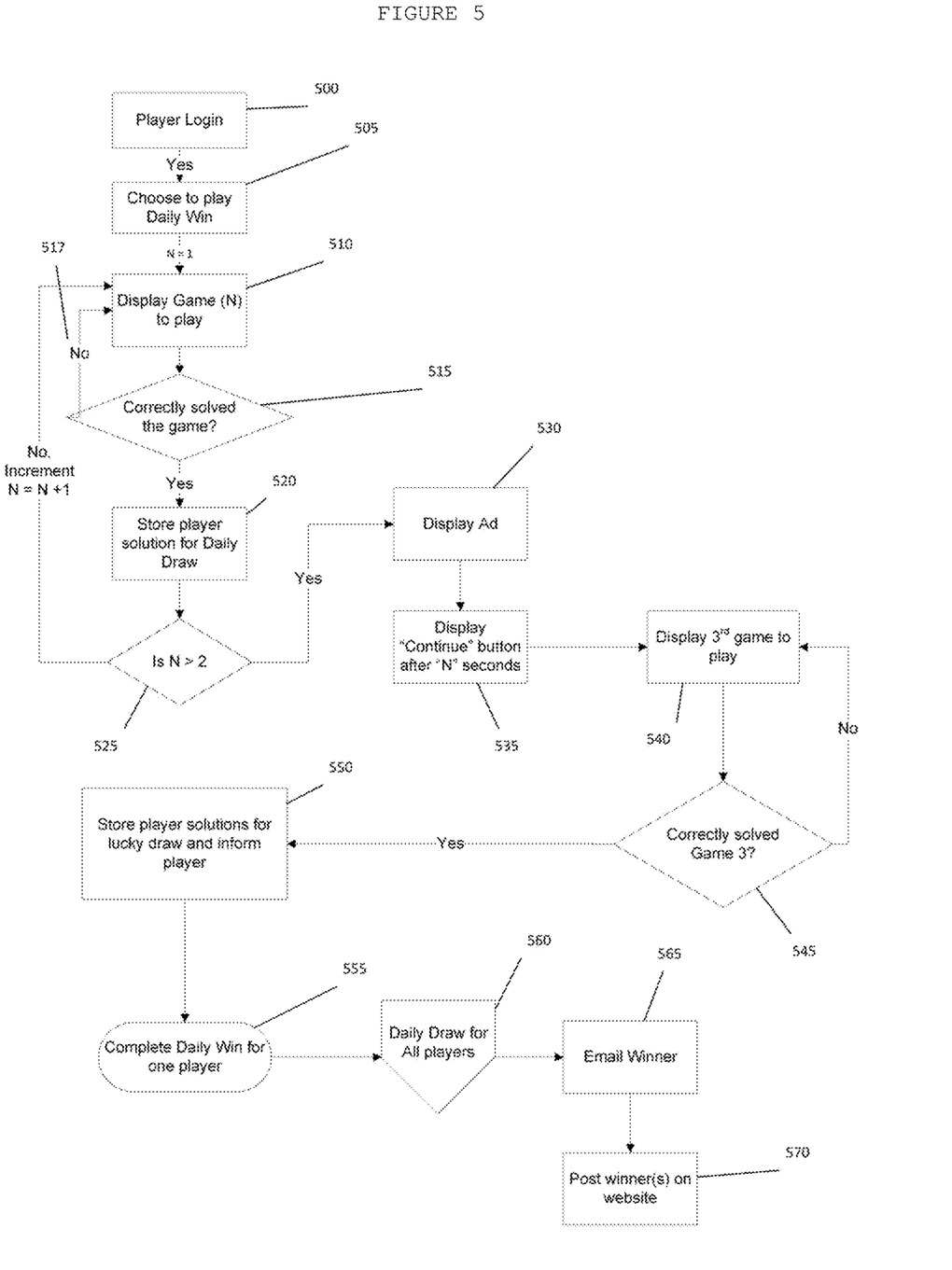
FIG. 5 is a flow chart for an embodiment of a "daily win" game.

FIG. 5 shows an Embodiment 2 for a Daily Win: The order of play for this embodiment is given below. A player must solve 3 problems correctly to get a chance to be entered inn the draw for the Daily Win. If there are more than one player who matches the winning solution, they share the Daily Win pot. It is possible to envision embodiments where the number of problems are different from 3 and the number of solutions for each problem are different from 8. The odds of winning in each of those instances will be different from the odds shown in embodiment 2.

1) Player logs-in to the system 500
2) Player chooses to play Daily Win 505. Set N=1, where N is the number of game being played and in this embodiment varies from 1 to 3.
3) Problem N such as shown in FIG. 2 with eight possible solutions is presented to the player for solving 510
4) Player solves the problem correctly 515 with one of the eight possible solutions. If the player did not solve the problem correctly 517, display the same game and give the player an opportunity to solve the problem correctly.
5) Player's correct solution is stored 520. Check whether N is greater than 2 525.
6) If not, set N=N+1 and repeat steps 3, 4, 5 for the next game.
7) If N is greater than 2, the Player is presented with an advertisement for "n" seconds 530 while the third game is being prepared. After "n" seconds, display the Continue button 535 to proceed to the third game.
8) Repeat steps 3, 4, 5 for Game 3
9) Store his three solutions for the Daily Draw 550. Player is informed that the daily drawing will be held at a pre-determined time later that day. Player will be informed by email if he wins and he can also check the winner(s)' name on the website.
11) Allow all players to play and store their solutions.
12) Conduct the drawing from all the solutions 560 submitted during the day at the time set by the system administrator to choose the winner.
13) Email the winning player 565 about his winning the Daily Win for that day.
14) Post the winning solutions on the website and the winner(s) name on the website 570. The rules can be set so that all players matching winning solutions share the Daily Win amount or choose one of these players is randomly selected to be the lucky winner. In this embodiment, all players matching the winning solution share the Daily Win pot.

For this embodiment, all problems have eight solutions. The odds of matching one solution correctly is one in 8. The odds of matching all 3 winning solutions are 1 in 512 (8×8×8). The expected revenue for 512 plays is 512× cents. The system can payout a fraction of the 512× cents, say, 50% of 512× cents. It is possible to envision the following situations: a) The number of solutions for each problem may be different from 8. The odds of winning can be changed day to day. b) In such a scenario, it is possible that the daily pot may also be changed depending on the odds of winning. This could be presented to the players and educate them about the probability of winning.

Figure 6:
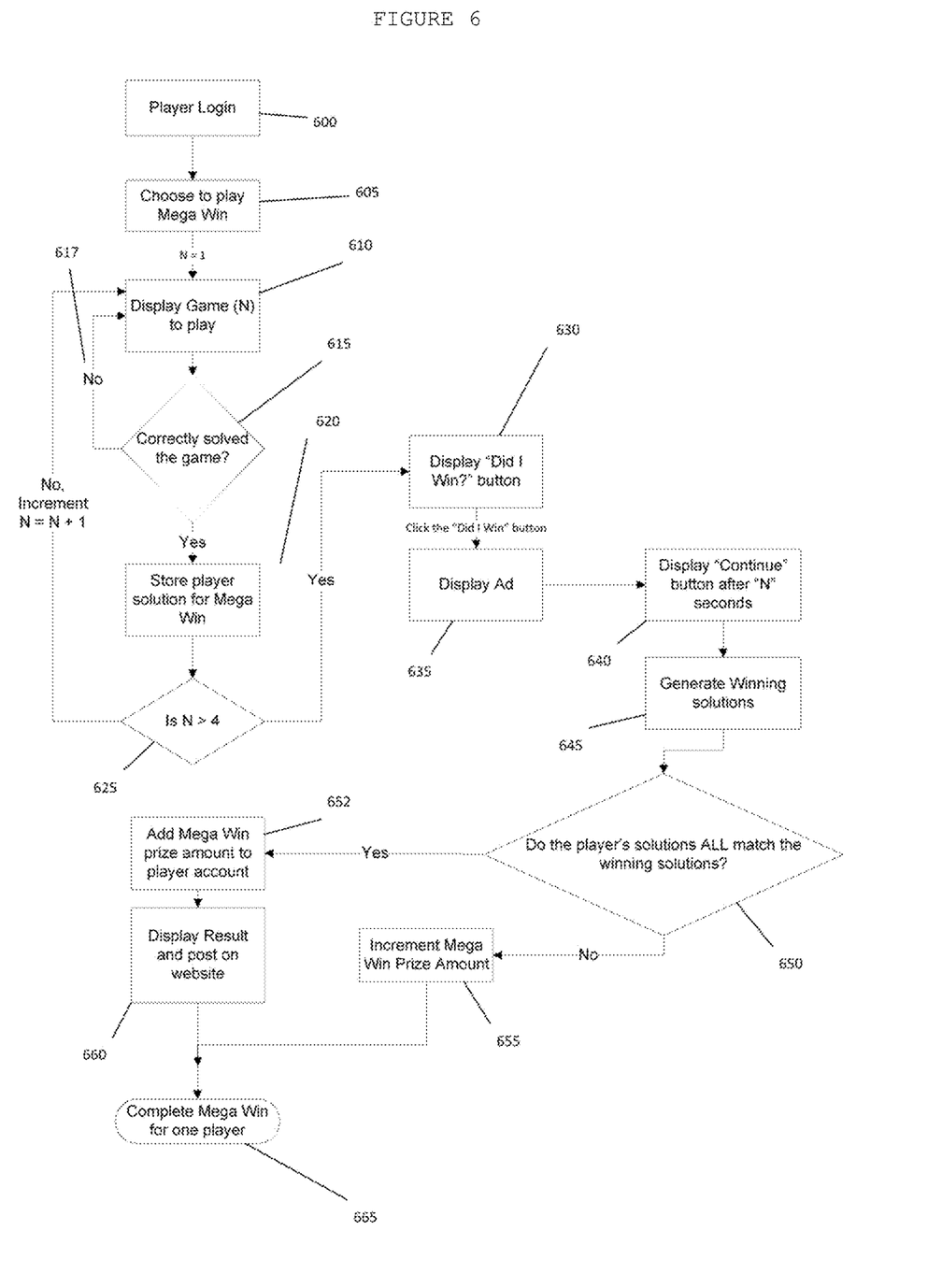
FIG. 6 is a flow chart for an embodiment of a "mega win" game.

FIG. 6 shows an Embodiment for Mega Win: The order of play for this embodiment is given below. A player must solve 5 problems correctly to get a chance to win the mega prize. In other embodiments, it is possible to envision the number of games to be different from 5 as well as the number of solutions for each problem to be different from 8.

The game is started with a jackpot of, say, $100.00
1) Player logs in to the system 600
2) Player chooses to play Mega Win 605. Set N=1, where N is the number of game being played and in this embodiment varies from 1 to 5.
3) Problem N such as shown in FIG. 2 with eight possible solutions is presented 610 to the player for solving.
4) Player solves the problem correctly with one of the solutions (615). If the player did not solve the problem correctly 617, display the same game and give the player an opportunity to solve the problem correctly.
5) Players correct solution is stored 620 for comparison with the winning solutions generated at the end 645. Check whether N is greater than 4.
6) If not, set N=N+1 and repeat steps 3, 4, 5 for N=2, 3, 4 and 5
7) If N is greater than 4, the Player is presented with the "Did I Win" button 630
10) Player presses the "Did I Win" button 630
11) System displays an advertisement for "n" seconds 635. Display the Continue button after "n" seconds 640. Next, generate the winning solutions 645.
13) Display the player's solutions and the winning solutions for all 5 problems side by side.
13.a. If all of the player's solutions match the winning solutions 650, declare the player as winner and add the jackpot to the player's winnings 652. Display the results and post the results on the website winners list.
13.b. If the player's solutions do not all match the winning solutions, declare the result and do not add any money to the player's winnings. Instead increment the Mega Win Prize Amount 655.

For this embodiment, all problems have eight solutions. The odds of matching one solution correctly is one in 8. The odds of matching all 5 winning solutions are 1 in 32, 768 (8×8×8×8×8). The expected revenue for 32, 768 plays is 32, 768× cents. The system can payout a fraction of the 32, 768× cents, say ($100+16, 384× cents) as an average payout. There is no waiting for the player to find out whether he/she won. The drawing is conducted in real time for each player.

In each of the above embodiments, help buttons will be provided so that the player who does not know how to solve a particular problem can ask for help and is shown the possible solutions. Also, undo buttons will be provided so that the player can back track an incorrect step.

It is anticipated that we can extend this system and method to allow more than one player to solve/answer the problems/questions. For example, in the mega-win embodiment described above, Game 1 could be solved by Player A. Player A could then send an invitation electronically (by text, email or social media) to Player B to solve the second game. Player B can send the invitation to Player C and so on. The invitation could be extended either when a player A, B or C has completed a game as shown above or when the player is in the midst of solving a problem. For example, in FIG. 2, Player X can do the first step in Solution 1 210, as 1+2=3 and then extend the invitation to Player Y. Player Y can then solve it as either 3+4=7 or 4+3=7. This provides for social sharing of the excitement in playing and winning. This social sharing is not limited to only the Mega Win embodiment but can be extended to the Instant Win and Daily Win embodiments.

A check-writing module and machine can be added to the invention so that the winnings can be distributed in the form of a check to the winners. The players may play this game on any network connected device including mobile phones, tablets, laptops and other computing devices so that they may access the server 300 accessible on that network.

This invention may also be extended to lotteries so that instant win, daily win and mega win games could be offered online where players buy a ticket.

This invention allows the player to monetize his viewing of an advertisement in addition to the company that is collecting and displaying the advertisements to him. The use of this monetization when combined with the ability to solve a problem with multiple solutions one way and then check whether this solution was a winning solution makes it new and a non-obvious combination.

Figure 7:
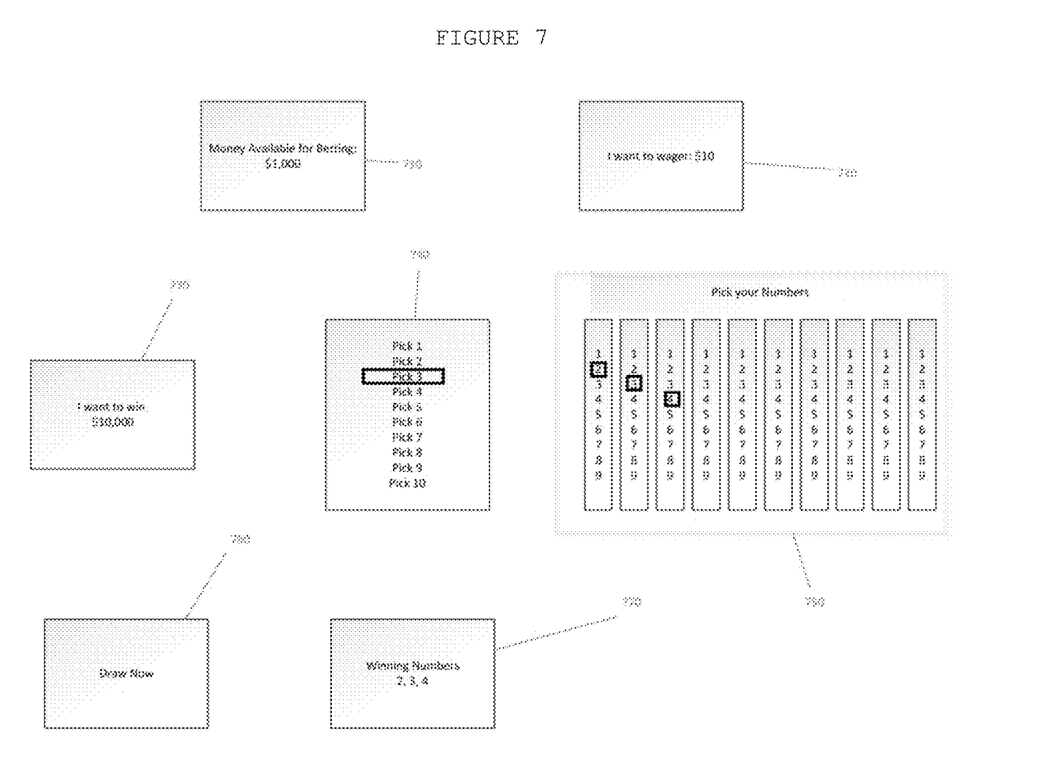
FIG. 7 is a schematic of a customizable game where a player can set the wager and the winnings.

Possible Extensions of this concept to games with and without a ticket price to play: FIG. 7 shows a schematic for an embodiment of a customizable game where a player can set the wager and the winnings. A player can deposit money in to his account and the amount available for betting is shown in 710. This player can set the amount he wants to wager in 720 and the money he wants to win in 730. As shown in FIG. 7, if a player chooses $10 to wager and $10,000 to win, a game with odds of winning is 1 in 1,000 needs to be presented. One simple example could be a Pick 3 game, where the player needs to choose 3 numbers ranging from 0 to 9 750 can be presented to him. If it is a Pick 3, as shown in FIG. 7, the player will be shown only three columns so that he can pick three numbers. Once the player picks the three numbers, say, 2, 3 and 4, the Draw Now button 760 is enabled to start the draw. After the three numbers are drawn, the winning numbers are presented to the player 770. For the sake of clarity, the numbers available to be picked by the player in 750 are shown to range from 0 to 9. It should be understood that any combination of numbers that yield the desired odds of 1 in 1,000 can be presented to the player. The odds and the winnings shown are for a game where there is no money set aside for the game organizer. Where necessary, the odds can be adjusted so that the game organizer can be allowed to earn money by modifying the odds. In the embodiment shown in FIG. 7, for example, the odds could be set as 1 in 1,100 so that the organizer could earn approximately 10% for organizing the game. As shown in FIG. 7, Pick Your Numbers 750, the odds can be easily adjusted from 1 in 2 to 1 in $10^{10}-1$.

The game shown could be played with real money and without real money. In instances where real money is used for wagering, the game will be regulated by local laws regarding gambling. Without real money used in wagering, the game can be played simply for entertainment without any restrictions. In case where real money is wagered, the player needs to deposit the money so that it is available for betting. In case where real money is not used, a player or the gaming company can set the money available for betting.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An educational gaming system comprising:
   a computer implemented server;
   a plurality of electronic device with a display unit and each of the plurality of device is operated by a player;
   each of the plurality of electronic device is connected to the computer implemented server by a communication network;
   wherein the computer implemented server comprises:
      a memory module, the memory module comprises a jackpot module;
      a random number generator module; and
      a processor configured for
   presenting a logging interface into the each of the plurality of electronic device for the player to log in the system and generating a plurality of options for the player to select from;
   generating and presenting through a web application, from a server, questions, problems or puzzles with multiple correct solutions based on the selection on the display unit of the electronic device and capturing the player's solution to the puzzle, and recording time of solution;
   calculating prize amounts and serving a web application from the server to various players playing the game on the electronic devices;
   displaying advertisements on the display unit of the electronic device to the player with an advertisement engine to generate revenue for offering this game;
   randomly choosing one of the multiple solutions as the winning solution or, in case of questions, problems or puzzles with a single solution, the time taken to solve or the time of solution as the winning number with the random number generator; and
   distributing winnings by cash, check, online payment or other legal means of payment for the winning solution.

2. The educational gaming system as claimed in claim 1, wherein the plurality of electronic devices are mobile phones, tablets, laptops and other computing devices.

3. The educational gaming system as claimed in claim 1, wherein the communication network is selected from internet cloud, Local Area Networks (LANs), Wide Area Network (WAN), cable, satellite.

4. The educational gaming system as claimed in claim 1, wherein the payment of winnings is in a form of goods and/or services whose value is higher than the winnings and this increase in the value is paid for by businesses in return for the advertisements of their products and services.

5. The educational gaming system as claimed in claim 1, wherein the jackpot module stores a preset amount or a progressive amount of winning.

6. The educational gaming system as claimed in claim 1, wherein the random number generator randomly choosing one of the multiple solutions as the winning solution or, in case of questions, problems or puzzles with a single solution, the time taken to solve and/or the time of solution as the winning number is executed and calculated immediately after a player provides the solution or on a periodic basis.

7. The educational gaming system as claimed in claim 1, wherein the prize is a fixed amount for time duration of the winning solution.

8. The educational gaming system as claimed in claim 1, wherein the prize amount increases as a progressive jackpot as the number of players attempting to win the prize increases.

9. The educational gaming system as claimed in claim 1, wherein more than one player play the game by providing means for one player to extend an invitation to a subsequent play so that all players may share in the winnings.

10. The educational gaming system as claimed in claim 1, wherein the means for invitation is an electronic media selected from text, e-mail or social media.

11. A computer implemented method of implementing operating an educational gaming system, the method comprising:
   presenting a logging interface into the each of the plurality of electronic device for a player to log in the system and generating a plurality of options for player to select from;
   generating and presenting through a web application, from a server, questions, problems or puzzles with multiple correct solutions based on the selection on the display unit of the electronic device and capturing the player's solution to the puzzle, and then recording a time of solution;
   calculating prize amounts and serving the web application from the server to various players playing the game on the electronic devices;
   displaying advertisements on the display unit of the electronic device to the player with an advertisement engine to generate revenue for offering this game;
   randomly choosing one of the multiple solutions as the winning solution or, in case of questions, problems or puzzles with a single solution, the time taken to solve or the time of solution as the winning number with the random number generator; and
   distributing winnings by cash, check, online payment or other legal means of payment for the winning solution.

12. The method as claimed in claim 11, wherein the payment of winnings is in the form of goods and/or services whose value is higher than the winnings and an increase in value is paid for by businesses in return for advertisements of their products and services.

13. The method as claimed in claim 11, wherein the randomly choosing one of the multiple solutions as the winning solution or, in case of questions, problems or puzzles with a single solution, the time taken to solve and/or the time of solution as the winning number with a random number generator is executed immediately after a player provides the solution.

14. The method as claimed in claim 11, wherein the randomly choosing one of the multiple solutions as the winning solution or, in case of questions, problems or puzzles with a single solution, the time taken to solve and/or the time of solution as the winning number with a random number generator is executed on a periodic basis.

15. The method as claimed in claim 11, wherein the prize is a fixed amount for a time duration of a draw.

16. The method as claimed in claim 11, wherein the prize amount increases as a progressive jackpot as the number of players attempting to win the prize increases.

17. The method as claimed in claim 11, wherein more than one player play the game by providing means for one player to extend an invitation electronically to a subsequent play so that all players may share in the winnings.

18. The method as claimed in claim 11, wherein the electronic means of invitation is selected from text, e-mail, or social media.

* * * * *